(12) United States Patent
Lee et al.

(10) Patent No.: US 9,994,258 B2
(45) Date of Patent: Jun. 12, 2018

(54) VEHICLE BODY SIDE REINFORCEMENT ASSEMBLY OF VEHICLE

(71) Applicant: HYUNDAI MOTOR COMPANY, Seoul (KR)

(72) Inventors: Ji Hyun Lee, Hwaseong-si (KR); Se Young Han, Yongin-si (KR); Kyung Bum Kang, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/353,434

(22) Filed: Nov. 16, 2016

(65) Prior Publication Data
US 2018/0099697 A1 Apr. 12, 2018

(30) Foreign Application Priority Data
Oct. 7, 2016 (KR) .................... 10-2016-0129933

(51) Int. Cl.
*B60N 99/00* (2006.01)
*B62D 21/15* (2006.01)
*B62D 25/04* (2006.01)
*B62D 25/20* (2006.01)

(52) U.S. Cl.
CPC ......... *B62D 21/157* (2013.01); *B62D 25/04* (2013.01); *B62D 25/2036* (2013.01); *B60Y 2304/05* (2013.01); *B60Y 2306/01* (2013.01); *B60Y 2410/124* (2013.01)

(58) Field of Classification Search
CPC .. B62D 21/157; B62D 25/04; B62D 25/2036; B60Y 2304/05; B60Y 2306/01; B60Y 2410/124
See application file for complete search history.

(56) References Cited

U.S. PATENT DOCUMENTS

| 6,247,287 B1* | 6/2001 | Takabatake | B29C 44/18 |
| | | | 264/46.6 |
| 9,365,242 B1* | 6/2016 | Yang | B62D 21/157 |
| 2011/0133515 A1* | 6/2011 | Mori | B62D 21/157 |
| | | | 296/193.06 |

(Continued)

FOREIGN PATENT DOCUMENTS

| JP | 3783546 B2 | 6/2006 |
| JP | 2007106161 A | 4/2007 |

(Continued)

*Primary Examiner* — Lori L Lyjak
(74) *Attorney, Agent, or Firm* — McDonnell Boehnen Hulbert & Berghoff LLP

(57) ABSTRACT

A vehicle body side reinforcement assembly includes a first side reinforcement panel; an inner center pillar coupled to the first side reinforcement panel and to a floor support forming a lower portion of a vehicle body; and a second side reinforcement panel coupled to the first side reinforcement panel, the inner center pillar, and the floor support to form a closed structure at a lower portion of the side of the vehicle. This structure improves vehicle body performance during a side collision by transferring the collision load to the floor support, resulting in improved safety performance. In addition, the assembly minimizes the number of necessary parts and allows for low-cost assembly methods, such as spot welding, thereby reducing production costs and increasing marketability.

7 Claims, 7 Drawing Sheets

(56) References Cited

U.S. PATENT DOCUMENTS

2016/0194036 A1* 7/2016 Kurokawa ........... B62D 29/005
                                                                              296/203.01

FOREIGN PATENT DOCUMENTS

| | | |
|---|---|---|
| KR | 10-1998-0029518 A | 7/1998 |
| KR | 10-2010-0026124 A | 3/2010 |
| KR | 1020140057848 A | 5/2014 |

* cited by examiner

VEHICLE BODY SIDE REINFORCEMENT ASSEMBLY OF VEHICLE

CROSS-REFERENCE TO RELATED APPLICATION

This application is based on and claims the benefit of priority to Korean Patent Application No. 10-2016-0129933, filed on Oct. 7, 2016 in the Korean Intellectual Property Office, the disclosure of which is incorporated herein in its entirety by reference.

TECHNICAL FIELD

The present disclosure relates to a vehicle body side reinforcement assembly, and more particularly, to a vehicle body side reinforcement assembly for improving collision performance by transferring a load to a floor support when a side collision occurs.

BACKGROUND

At present, reinforcement of a vehicle body side is generally achieved by coupling a side sill inner beam protruding from a lower portion of the inside of a vehicle body side panel towards the vehicle interior with a side sill outer beam protruding towards the vehicle interior to thereby form a side sill.

FIG. 1 is a view illustrating a vehicle body side reinforcement assembly according to the related art.

The vehicle body side reinforcement assembly according to the related art forms a cross-sectional "L"-shaped structure or 'L' by connecting a first side reinforcement panel 10, a lower end portion of an inner center pillar 20, and a floor support 30 to one another, as illustrated in FIG. 1.

Because the vehicle body side reinforcement assembly is formed in the 'L' structure, a collision load is not transferred to the floor support 30 forming a lower portion of a vehicle body when a side collision occurs. Because the load is transmitted through the vehicle body side, the safety performance of the vehicle body is degraded.

In addition, according to the related art, a side reinforcement assembly may include a bulkhead 40 to prevent the vehicle body from splitting when a side collision occurs, as shown in FIG. 1. In this configuration, an inner panel may be welded to be extended to a lower end portion of the side sill; however, when the side reinforcement assembly and the floor support 30 of the vehicle body are matched to each other, there is no room to insert a welding gun to weld the side reinforcement assembly and the floor support together. Without a weld in a horizontal direction in which the load is input when the side collision occurs, safety performance is degraded. Moreover, the constraints on space in this configuration require the use of costly additional materials, such as injected plastic to further reinforce the vehicle side, resulting in increased costs.

SUMMARY

The present disclosure has been made to solve the above-mentioned problems in the prior art.

An aspect of the present disclosure provides a vehicle body side reinforcement assembly, and more particularly, a vehicle body side reinforcement assembly for improving collision performance by transferring a load to a floor support when a side collision occurs.

According to an example embodiment of the present disclosure, a vehicle body side reinforcement assembly includes: a first side reinforcement panel; an inner center pillar coupled to one surface of the first side reinforcement panel and to a floor support thereby forming a lower portion of a vehicle body; and a second side reinforcement panel coupled to the first side reinforcement panel, the inner center pillar, and the floor support to form a closed structure at a lower portion of the side of the vehicle.

The second side reinforcement panel may include: a reinforcement plate connecting the first side reinforcement panel and the inner center pillar to each other; and a bulkhead coupled to the reinforcement plate and the floor support.

The reinforcement plate may be coupled to the inner center pillar by a conventional, inexpensive methods such as spot welding, and similarly, the bulkhead may be coupled to the reinforcement plate by spot welding.

One end of the floor support may be connected to a lower portion of a vehicle body side outer panel, and the other end thereof may be coupled to the inner center pillar and the reinforcement plate by spot welding.

The reinforcement plate coupled to the bulkhead may be welded to the first side reinforcement panel to form a "C"-shaped cross-sectional structure or 'L', that facilitates transmission of the load from a side collision to a floor support.

Additional, cost-effective, shock-absorbing and/or insulting materials may be used to further reinforce the vehicle body side. For example, inexpensive foam pads may be mounted on a top surface of the reinforcement plate.

The reinforcement plate is designed to have a length in the same direction as the length of the vehicle (i.e. extending in a direction from the front to the rear of the vehicle), such that, when coupled to a lower portion of the first side reinforcement panel, it provides improved collision performance and assists in preventing deformation and/or splitting of the vechicle body side.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Example embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. Other example embodiments or features may further be utilized, and other changes may be made, without departing from the scope of the subject matter presented herein. The example embodiments described herein are not meant to be limiting. Thus, aspects of the present disclosure, as generally described herein and illustrated in the figures, can be arranged, substituted, combined, separated and designed in a wide variety of different configurations, all of which are explicitly contemplated herein.

Figure 1:
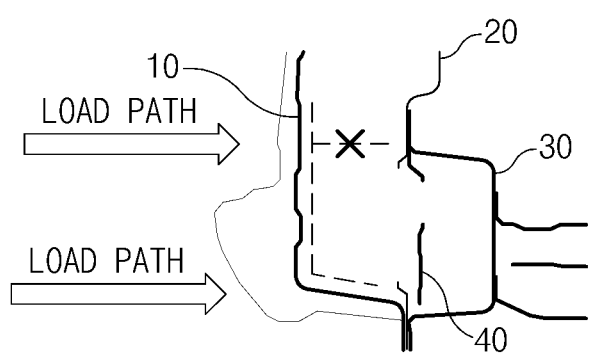
FIG. 1 is a view illustrating a vehicle body side reinforcement assembly according to the related art.
Figure 2:
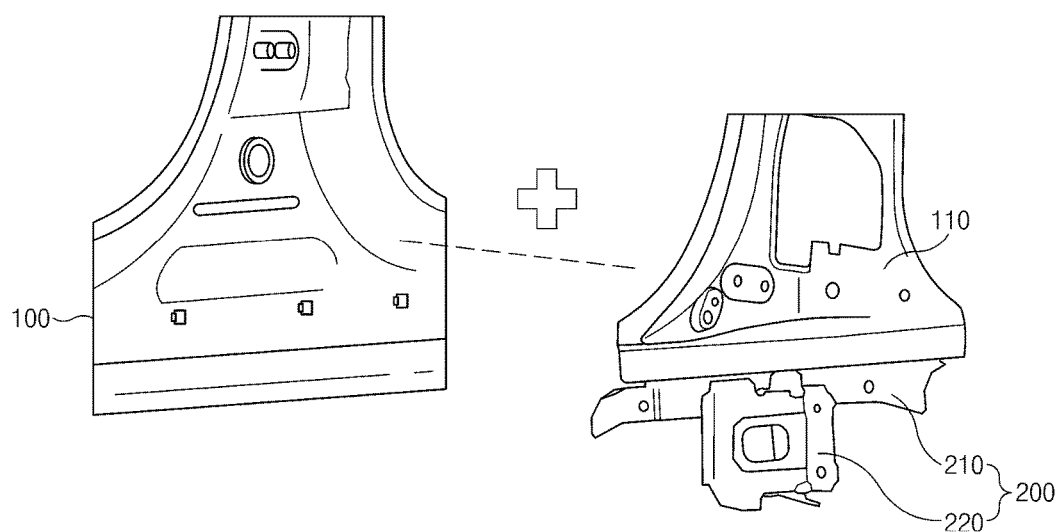
FIG. 2 is a view illustrating an example vehicle body side reinforcement assembly having a first side reinforcement panel, an inner center pillar, and a second side reinforcement panel.
Figure 3:
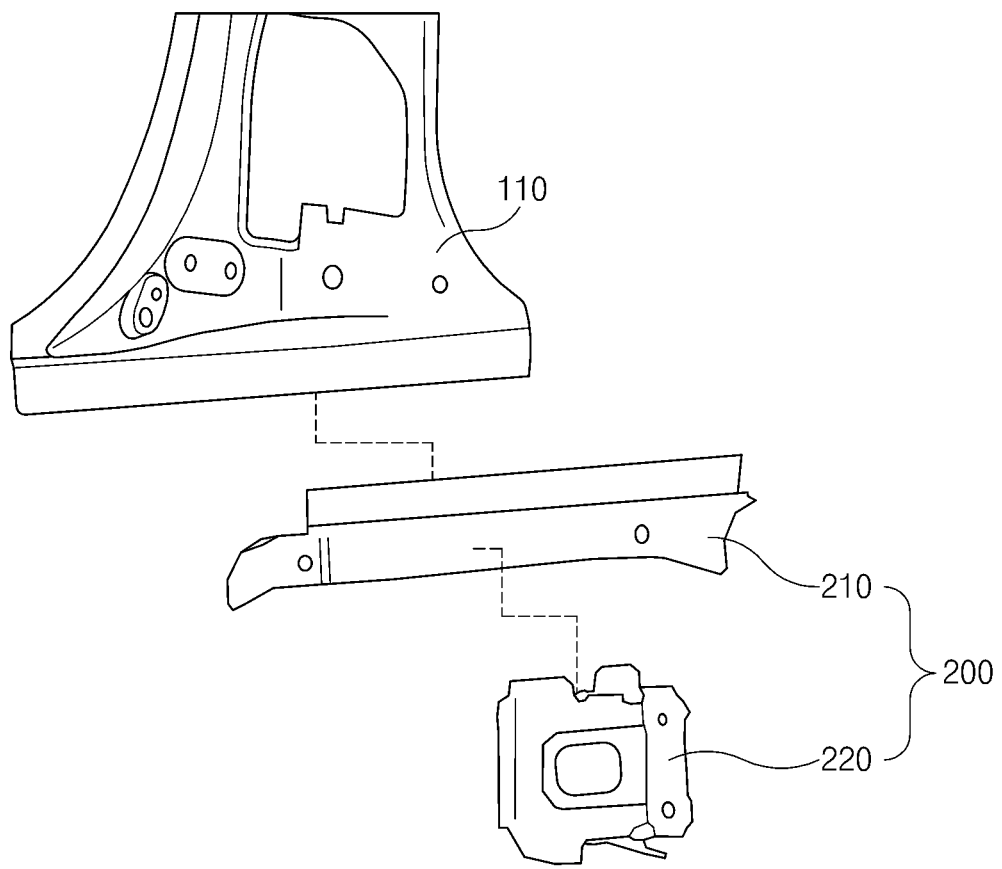
FIG. 3 is a view illustrating an example vehicle body side reinforcement assembly having an inner center pillar and a second side reinforcement panel coupled to each other.
Figure 4:
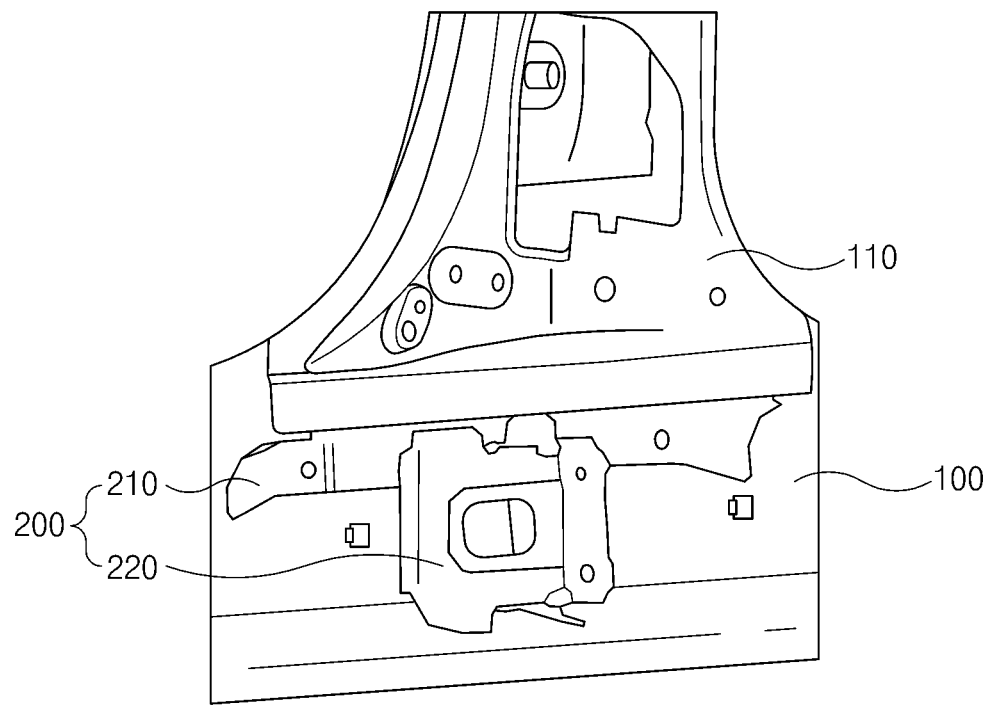
FIG. 4 is a view illustrating an example vehicle body side reinforcement assembly having a first side reinforcement panel couple to an inner center pillar, and a second side reinforcement panel coupled to the inner center pillar and to the first side reinforcement panel.

In an example embodiment, a vehicle body side reinforcement assembly includes a first side reinforcement panel 100 included in the vehicle, an inner center pillar 110 coupled to a surface of the first side reinforcement panel 100, and a second side reinforcement panel 200 coupled to the first side reinforcement panel 100, the inner center pillar 110, and a floor support 120, as illustrated in FIGS. 2 to 4.

The first side reinforcement panel 100 is disposed at an inner side (i.e. towards the interior of the vehicle) of a vehicle body side outer panel 101. Addition of the first side reinforcement panel 100 to the vehicle body side outer panel reinforces the hardness of the side of the vehicle.

The first side reinforcement panel 100 includes a surface facing the inner side of the vehicle body side outer panel and a surface facing the interior of the vehicle. In an example embodiment, the inner center pillar 110 is coupled to the surface of the first side reinforcement panel 100 facing the interior of the vehicle. The inner center pillar may also be coupled to the floor support 120, thereby forming a lower portion of the vehicle body to support the roof of the vehicle and to reinforce the hardness of the vehicle body between the roof and the floor.

In an example embodiment, a second side reinforcement panel 200 may be coupled to the first side reinforcement panel 100, the inner center pillar 110, and the floor support 120 to form a closed structure at a lower portion of the side of the vehicle, thereby allowing a collision load to be transferred to the floor support.

In this example, the second side reinforcement panel 200 includes a reinforcement plate 210, and a bulkhead 220 coupled to the reinforcement plate 210, as shown in FIGS. 2 and 3. The reinforcement plate is designed to extend lengthwise in a direction along the length of the vehicle, i.e. from the front to the rear of the vehicle.

The upper portion of reinforcement plate 210 may be coupled to a lower portion of inner center pillar 110 and also coupled to the first side reinforcement panel 100, thereby connect the first side reinforcement panel 100 and the inner center pillar 110 to each other.

Bulkhead 220 may take the shape of a box structure of which one side is opened. The lower portion of reinforcement plate 210 may be coupled to the opened surface of bulkhead 220 thereof is coupled to the other side of the reinforcement plate. A closed surface of bulkhead 220 opposite the opened surface may be coupled to the floor support 120, thereby connecting the reinforcement plate 210 and the floor support 120 to each other.

Reinforcement plate 210 may be coupled to the inner center pillar 110 by known, simple, low-cost methods, such as spot welding. Similarly, bulkhead 220 may be coupled to reinforcement plate 210 by the spot welding.

Figure 5:
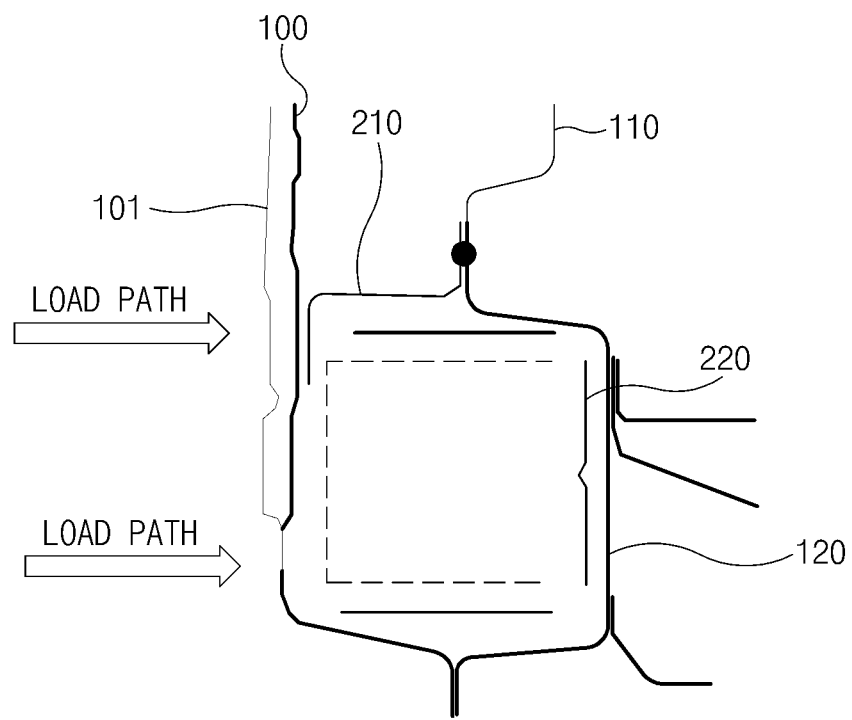
FIG. 5 is a cross-sectional view illustrating an example vehicle body side reinforcement assembly having a first side reinforcement panel couple to an inner center pillar, and a second side reinforcement panel coupled to the inner center pillar and to the first side reinforcement panel.
Figure 6:
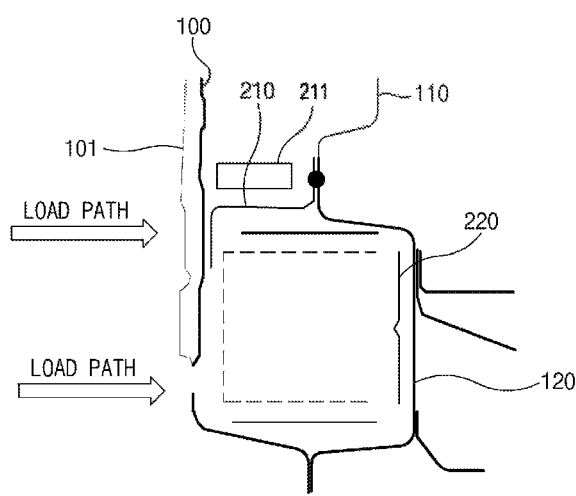
FIG. 6 is a cross-sectional view illustrating a structure in which an example vehicle body side reinforcement assembly further includes a foam pad.

In additional example embodiments, as shown in FIGS. 5 & 6, one end of the floor support 120 may be coupled to a lower portion of the vehicle body side outer panel 101 formed at the outside of the first side reinforcement panel 100, and the other end thereof may be coupled to the inner center pillar 110 and the reinforcement plate 210. As with the reinforcement plate 210 and bulkhead 220, conventional, low-cost methods, including but not limited to spot welding, may be used to couple the floor support 120 to the inner center pillar 110 and the reinforcement plate 210.

As illustrated in FIG. 5, when the reinforcement plate 210 coupled to the bulkhead 220 is welded to the first side reinforcement panel 100, the resulting cross-section structure is a "C" shape or 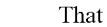.

That is, according to the present disclosure, the reinforcement plate 210 coupled to the bulkhead 220 is welded to the first side reinforcement panel 100, the inner center pillar 110, and the floor support 120, such that the first side reinforcement panel 100, the reinforcement plate 210, and the bulkhead 220 form the cross section structure of a  shape, thereby making it possible to transfer a load input to a lower portion of the side of the vehicle when a side collision occurs to the floor support 120.

Figure 7:
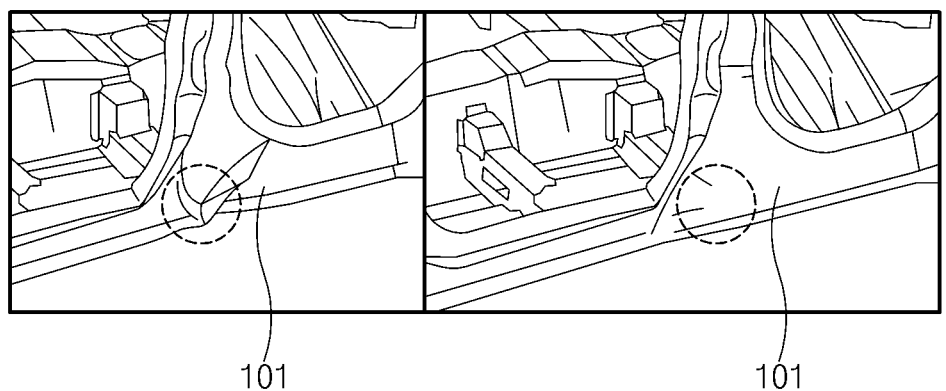
FIG. 7 is a view illustrating the improvement in side collision performance using an example vehicle body side reinforcement assembly as compared to the related art.

As illustrated in FIG. 7, in example embodiments, the vehicle body side reinforcement assembly improves collision performance over existing methods by transferring the load away from the vehicle body side to the vehicle floor. This decreases the likelihood that portions of the vehicle body side, and, in particular, a side sill, will deform and/or split during a collision, as shown in the first panel of FIG. 7.

As illustrated in FIG. 6, in an example embodiment, reinforcement plate 210 is positioned between first side reinforcement panel 100 and inner center pillar 110 in such a way that it creates an interstitial space above reinforcement plate 210 and between first side reinforcement panel 100 and inner center pillar 110. This space may be filled with a shock-absorbing and/or insulating material. In an example embodiment, the material is a low-cost foam pad 211. Use of low-cost materials (as opposed to, for example, more expensive injection-molded plastic pads) to fill the interstitial space imparts additional enhanced reinforcement of the vehicle body side while reducing overall production costs. It is understood that other materials may also be used to fill the interstitial space.

In a further example embodiment, the reinforcement plate 210 has a length extending in the same direction as the length of the vehicle, i.e. from the front to the rear of the vehicle. The length and positioning of the reinforcement plate 210 is such that, when it is coupled to the lower portion of the first side reinforcement panel 100, it thereby prevents deformation of the vehicle body at a front door, a rear door, or both in the event of a side collision.

The side reinforcement assembly includes the first side reinforcement panel 100 formed at the side of the vehicle; the inner center pillar 110 formed on one surface of the first side reinforcement panel 100 and coupled to the floor support 120 forming the lower portion of the vehicle body; and the second side reinforcement panel 200 coupled to the first side reinforcement panel 100, the inner center pillar 110, and the floor support 120 to form the closed structure at the lower portion of the side of the vehicle, whereby the load is transferred to the floor support 120 when the side collision occurs to improve the load transfer structure, thereby making it possible to improve safety.

As described above, with reference to the example embodiments, collision performance during a side collision is improved by transferring the collision load from the vehicle side to the floor support, thereby improving safety performance. In addition, the example embodiments provide for the use of low-cost materials and manufacturing processes, reducing overall production costs, and increasing marketability.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body side reinforcement assembly, the side reinforcement assembly comprising:
   a first side reinforcement panel;
   an inner center pillar coupled to the first side reinforcement panel and to a floor support forming a lower portion of a vehicle body; and
   a second side reinforcement panel coupled to the first side reinforcement panel, the inner center pillar, and the floor support to form a closed structure at a lower portion of the side of the vehicle.

2. The vehicle body side reinforcement assembly according to claim 1, wherein the second side reinforcement panel includes:
   a reinforcement plate connecting the first side reinforcement panel and the inner center pillar to each other; and
   a bulkhead coupled to the reinforcement plate and the floor support.

3. The vehicle body side reinforcement assembly according to claim 2, wherein the reinforcement plate is coupled to the inner center pillar by spot welding, and
   the bulkhead is coupled to the reinforcement plate by spot welding.

4. The vehicle body side reinforcement assembly according to claim 3, wherein one end of the floor support is connected to a lower portion of a vehicle body side outer panel, and the other end thereof is coupled to the inner center pillar and the reinforcement plate by spot welding.

5. The vehicle body side reinforcement assembly according to claim 3, wherein the reinforcement plate coupled to the bulkhead is welded to the first side reinforcement panel to form a C-shaped cross-sectional structure in the shape 'ㄴ'.

6. The vehicle body side reinforcement assembly according to claim 2, wherein a pad is mounted on a top surface of the reinforcement plate.

7. The vehicle body side reinforcement assembly according to claim 2, wherein the reinforcement plate is coupled to a lower portion of the first side reinforcement panel.

* * * * *